United States Patent
Sabouri-Sichani et al.

(10) Patent No.: US 12,232,206 B2
(45) Date of Patent: Feb. 18, 2025

(54) LOW-LATENCY COMMUNICATION WITH DISCONTINUOUS TRANSMISSION

(71) Applicant: Nokia Technologies Oy, Espoo (FI)

(72) Inventors: Faranaz Sabouri-Sichani, Aalborg (DK); Nuno Manuel Kiilerich Pratas, Gistrup (DK); Lianghai Ji, Aalborg (DK); Berthold Panzner, Holzkirchen (DE); Ranganathan Mavureddi Dhanasekaran, Munich (DE); Panagiotis Spapis, Munich (DE); Daniel Medina, Munich (DE)

(73) Assignee: NOKIA TECHNOLOGIES OY, Espoo (FI)

(*) Notice: Subject to any disclaimer, the term of this patent is extended or adjusted under 35 U.S.C. 154(b) by 392 days.

(21) Appl. No.: 17/709,717

(22) Filed: Mar. 31, 2022

(65) Prior Publication Data

US 2022/0322487 A1 Oct. 6, 2022

(30) Foreign Application Priority Data

Mar. 31, 2021 (FI) .................................... 20215380

(51) Int. Cl.
*H04W 76/28* (2018.01)
*H04W 72/20* (2023.01)

(52) U.S. Cl.
CPC .......... *H04W 76/28* (2018.02); *H04W 72/20* (2023.01)

(58) Field of Classification Search
CPC ...... H04W 76/28; H04W 72/20; H04W 68/02
See application file for complete search history.

(56) References Cited

U.S. PATENT DOCUMENTS

| 2016/0286590 | A1* | 9/2016 | Cheng ..................... H04W 4/02 |
| 2020/0053647 | A1 | 2/2020 | Chae et al. |
| 2020/0305174 | A1 | 9/2020 | Ganesan et al. |
| 2021/0058833 | A1* | 2/2021 | Basu Mallick ......... H04L 69/28 |
| 2021/0059005 | A1* | 2/2021 | Hosseini ................. H04W 4/40 |
| 2022/0191965 | A1* | 6/2022 | Agiwal ............ H04W 72/1263 |
| 2022/0248481 | A1* | 8/2022 | Sabouri-Sichani ... H04W 16/26 |
| 2022/0353945 | A1* | 11/2022 | Liu ........................ H04W 76/28 |

(Continued)

FOREIGN PATENT DOCUMENTS

| EP | 3609259 A1 | 2/2020 |
| WO | WO 2017/052602 A1 | 3/2017 |

(Continued)

OTHER PUBLICATIONS

"2018 Road Safety Statistics: What is Behind the Figures?", European Commission Fact Sheet, (Apr. 4, 2019), 8 pages.

(Continued)

*Primary Examiner* — Deepa Belur
(74) *Attorney, Agent, or Firm* — Lippes Mathias LLP

(57) ABSTRACT

Apparatus and method for communication are provided. One or more link identifiers used by a first terminal device are obtained. Information on communication of another terminal device with the first terminal device based on the obtained one or more link identifiers is obtained. Based on the obtained information, it is determined, that the first terminal device is active for communication and transmission to the first terminal device performed based on the determination.

20 Claims, 7 Drawing Sheets

(56) References Cited

U.S. PATENT DOCUMENTS

2024/0057124 A1* 2/2024 Park .................. H04W 52/0235
2024/0356680 A1* 10/2024 Di Girolamo .......... H04W 4/06

FOREIGN PATENT DOCUMENTS

WO     WO 2017/196611 A1     11/2017
WO     WO 2021/029672 A1     2/2021

OTHER PUBLICATIONS

"3rd Generation Partnership Project; Technical Specification Group Radio Access Network; NR; Medium Access Control (MAC) protocol specification (Release 16)", 3GPP TS 38.321 v16.4.0, (Mar. 2021), 157 pages.

"3rd Generation Partnership Project; Technical Specification Group Radio Access Network; NR; Physical layer procedures for data (Release 16)", 3GPP TS 38.214 v16.5.0, (Mar. 2021), 171 pages.

"3rd Generation Partnership Project; Technical Specification Group Radio Access Network; NR; Study on User Equipment (UE) power saving in NR (Release 16)", 3GPP TR 38.840 v16.0.0, (Jun. 2019), 74 pages.

"3rd Generation Partnership Project; Technical Specification Group Radio Access Network; Study on evaluation methodology of new Vehicle-to-Everything (V2X) use cases for LTE and NR; (Release 15)", 3GPP TR 37.885 v15.3.0, (Jun. 2019), 38 pages.

"3rd Generation Partnership Project; Technical Specification Group Radio Access Network; Study on LTE Device to Device Proximity Services; Radio Aspects (Release 12)", 3GPP TR 36.843 v12.0.1, (Mar. 2014), 50 pages.

"3rd Generation Partnership Project; Technical Specification Group Services and System Aspects; Study on architecture enhancements for 3GPP support of advanced Vehicle-to-Everything (V2X) services; Phase 2 (Release 17)", 3GPP TR 23.776 v17.0.0, (Mar. 2021), 29 pages.

"3rd Generation Partnership Project; Technical Specification Group Services and System Aspects; System architecture for the 5G System (5GS); Stage 2 (Release 17)", 3GPP TS 23.501 v17.0.0, (Mar. 2021), 489 pages.

"C-V2X Use Cases, Methodology, Examples and Service Level Requirements", 5G Automotive Association, White Paper, (Jun. 19, 2019), 77 pages.

"Vulnerable-Road-User-Protection", 5G Automotive Association, White Paper, (Aug. 24, 2020), 27 pages.

Fujitsu, "Sidelink DRX for Power Saving", 3GPP TSG RAN WG2 Meeting #112-E, R2-2009133, (Nov. 2-13, 2020), 16 pages.

Huawei et al., "Consideration on Sidelink DRX for Groupcast and Broadcast", 3GPP TSG-RAN WG2 Meeting #113-e, R2-2101723, (Jan. 25-Feb. 5, 2021), 4 pages.

LG Electronics, "Discussion on Physical Layer Design Considering Sidelink DRX Operation", 3GPP TSG RAN WG1 #103-e, R1-2007897, (Oct. 26- Nov. 13, 2020), 15 pages.

LG Electronics, "WID Revision: NR Sidelink Enhancement", 3GPP TSG RAN Meeting #89e, RP-201516, (Sep. 14-18, 2020), 6 pages.

Notice of Allowance for Finland Application No. 20215380 dated Mar. 29, 2022, 4 pages.

Office Action for Finland Application No. 20215380 dated Nov. 16, 2021, 9 pages.

Schlienz et al., "Device to Device Communication in LTE", Whitepaper, Rohde & Schwarz, (Sep. 29, 2015), 36 pages.

\* cited by examiner

LOW-LATENCY COMMUNICATION WITH DISCONTINUOUS TRANSMISSION

CROSS-REFERENCE TO RELATED APPLICATIONS

This application claims priority to Finnish Patent Application No. 20215380 filed Mar. 31, 2021, the entire contents of which are incorporated herein by reference.

FIELD

The exemplary and non-limiting embodiments of the invention relate generally to wireless communication systems. Embodiments of the invention relate especially to apparatuses and methods in wireless communication networks.

BACKGROUND

Wireless communication systems are under constant development.

Wireless communication amongst vehicles has been under study during recent years. Vehicular connectivity over cellular technology, such as cellular system developed by Third Generation Partnership Project, 3GPP, is denoted as Cellular Vehicle to Everything, C-V2X. It is being standardized along with the development of 5G (or New Radio, NR) communication system. Direct Vehicle to Vehicle communication without a link via a Radio Access Network, RAN, node, is denoted as sidelink.

It has been estimated that development of Intelligent transportation systems, ITS, will improve road safety and traffic efficiency. Communication between vehicles and between infrastructure is a vital part of ITS. Vehicle-to-vehicle communication, V2V, vehicle-to-infrastructure communication, V2I, and Vehicle to Everything, V2X, will enable communication related to various use cases, such as broadcasting situation awareness messages for assisted driving, sending emergency alerts (braking and vulnerable road user detection, for example) to increase safety, executing cooperative manoeuvres such as lane merging or platooning and more. In 5G, the V2X air interface is called PC5 interface.

Road safety relates not only motorized vehicles but also pedestrians, cyclists, road workers, for example. These may be called Vulnerable Road Users, VRUs. These users typically use handheld terminal devices which have limitations on the battery levels and require mechanisms to reduce power consumption. One such mechanism is the discontinuous reception, DRX. In DXR, terminal devices enter a power saving sleep mode from time to time. In sleep mode they are not able to receive (or transmit). Thus, reception of urgent messages, related for example to road safety, may be delayed. The same applies also to other cases such as public safety, for example.

SUMMARY

The following presents a simplified summary of the invention in order to provide a basic understanding of some aspects of the invention. This to summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there are provided apparatuses of claims 1 and 7.

According to an aspect of the present invention, there are provided telecommunication systems of claims 8 and 9.

According to an aspect of the present invention, there is provided a method of claim 10.

According to an aspect of the present invention, there is provided a computer program of claim 16.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Embodiments of the present invention are described below, by way of example only, with reference to the accompanying drawings, in which FIGS. 1 and 2 illustrate examples of simplified system architecture of a communication system;

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features, structures, units, modules etc. that have not been specifically mentioned.

Some embodiments of the present invention are applicable to a user terminal, a communication device, a base station, eNodeB, gNodeB, a distributed realisation of a base station, a network element of a communication system, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
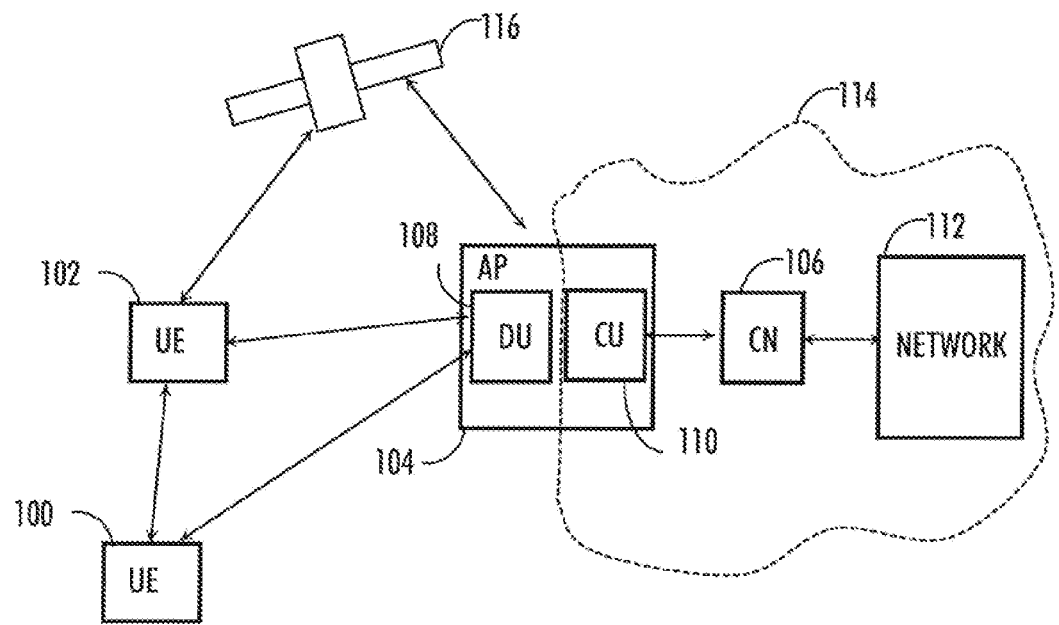

FIG. 1 depicts an example of a simplified system architecture of a telecommunication system in which some embodiments may be applied. The Figure is only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 are configured to be in a wireless connection on one or more communication channels with a node 104. The node 104 is further connected to a core network 106. In one example, the node 104 may be an access node such as (e/g)NodeB serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC). Depending on the deployed technology, the (e/g)NodeB is connected to a serving and packet data network gateway (S-GW+P-GW) or user plane function (UPF), for routing and forwarding user data packets and for providing connectivity of devices to one ore more external packet data networks, and to a mobile management entity (MME) or access mobility management function (AMF), for controlling access and mobility of the devices.

Exemplary embodiments of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cm Wave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 108) and non-real time functions being carried out in a centralized manner (in a centralized unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H (e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
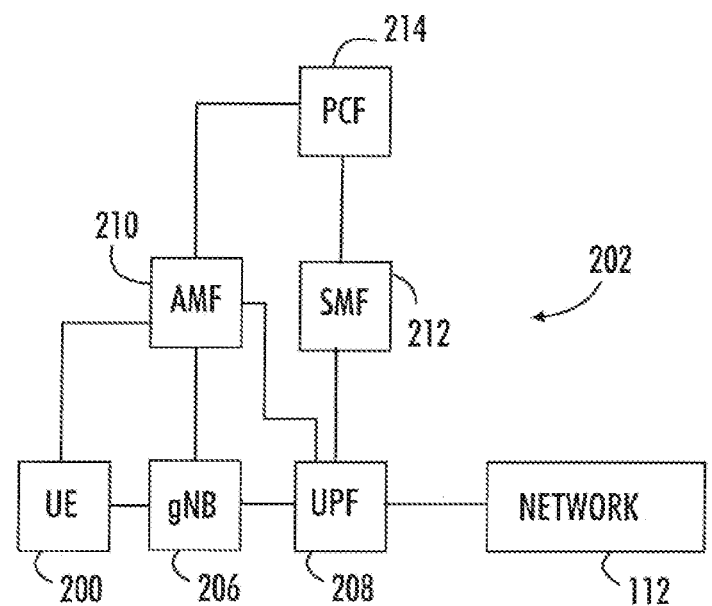

FIG. 2 illustrates an example of a communication system of a telecommunication system in which some embodiments may be applied. The system of FIG. 2 is based on 5G network components. A user terminal or user equipment 200 communicating via a 5G network 202 with a data network 112. The user terminal 200 is connected to a Radio Access Network RAN node, such as (e/g)NodeB 206 which provides the user terminal with a connection to the network 112 via one or more User Plane Functions, UPF 208. The user terminal 200 is further connected to Core Access and Mobility Management Function, AMF 210, which is a control plane core connector for (radio) access network and can be seen from this perspective as the 5G version of Mobility Management Entity, MME, in LTE. The 5G network further comprises Session Management Function, SMF 212, which is responsible for subscriber sessions, such as session establishment, modify and release, and a Policy Control Function, PCF 214 which is configured to govern network behavior by providing policy rules to control plane functions.

One method developed for reducing power consumption of terminal devices is discontinuous reception, DRX. DRX is to be supported in the power efficient sidelink communications in 5G.

Typically, in NR for the UE to cellular network (Uu) interface, DRX is configured by Radio Resource Control, RRC, protocol and in DRX active time of a terminal device is controlled. It provides opportunity for the terminal device to go to sleep and thereby save energy. RRC controls DRX operation by configuring a set of parameters, called DRX Configuration, among which the most relevant ones are as follows:

- drx-onDurationTimer: the duration at the beginning of a DRX Cycle;
- drx-SlotOffset: the delay before starting the drx-onDurationTimer;
- drx-InactivityTimer: the duration after the PDCCH occasion in which a PDCCH indicates a new uplink or downlink transmission for the MAC entity;
- drx-RetransmissionTimerDL: the maximum duration until a downlink retransmission is received;
- drx-RetransmissionTimerUL: the maximum duration until a grant for uplink retransmission is received.

PDCCH denotes Physical Downlink Control Channel and MAC denotes Medium Access Control.

When a DRX cycle is configured, the Active Time includes the time while:

- drx-onDurationTimer or drx-InactivityTimer or drx-Retransmission-TimerDL or drx-RetransmissionTimerUL or ra-ContentionResolutionTimer is running; or
- a Scheduling Request is sent on Physical Uplink Control Channel, PUCCH, and is pending; or
- a PDCCH indicating a new transmission addressed to the C-RNTI of the MAC entity has not been received after successful reception of a Random Access Response for the Random Access Preamble not selected by the MAC entity among the contention-based Random Access Preamble.

C-RNTI denotes Cell Radio Network Temporary Identifier.

Figure 3:
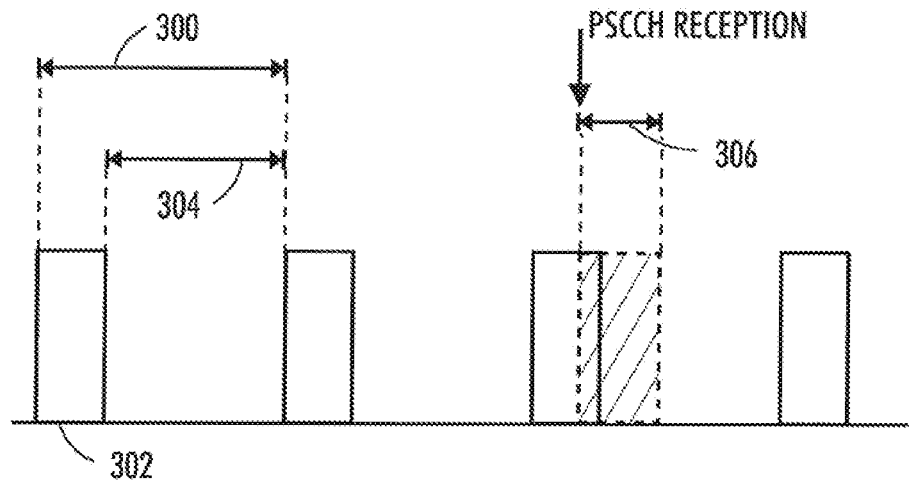
FIG. 3 illustrates a discontinuous transmission cycle.

FIG. 3 illustrates a DRX cycle 300. The terminal device may be active during OnDuration Timer 302 and sleep 304 outside the DRX OnDuration. Drx-InactivityTimer 306 starts running when the terminal device receives a Downlink Control Information, DCI, addressed to itself in the received PDCCH.

Figure 4:
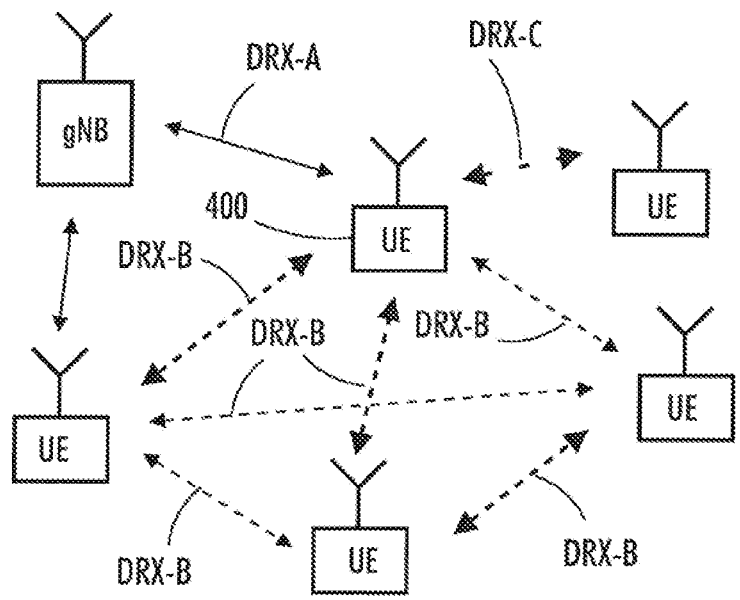
FIG. 4 illustrates an example of terminal devices with different discontinuous transmission configurations.

A terminal device utilising sidelink communication may have more than one DRX configuration for communication over PC5 air interface with different peer terminal devices, e.g. for unicast, groupcast, and/or broadcast. This is illustrated in the example of FIG. 4. In the example of FIG. 4, there are terminal devices with different DRX configurations. The terminal device 400 communicates with other terminal devices and/or gNB using three different DRX configurations DRX-A, DRX-B and DRX-C. However, each peer terminal device of the terminal device 400 may not know all the DRX configurations used by the terminal device 400. As an example, a peer terminal device of the terminal device 400 may only need to know one of the DRX configurations used by the terminal device 400, e.g. DRX-B and/or DRX-C, such that the peer terminal device may transmit to the terminal device 400 by using the configuration with that known DRX configuration, e.g. transmit in the corresponding DRX OnDuration.

Figure 5:
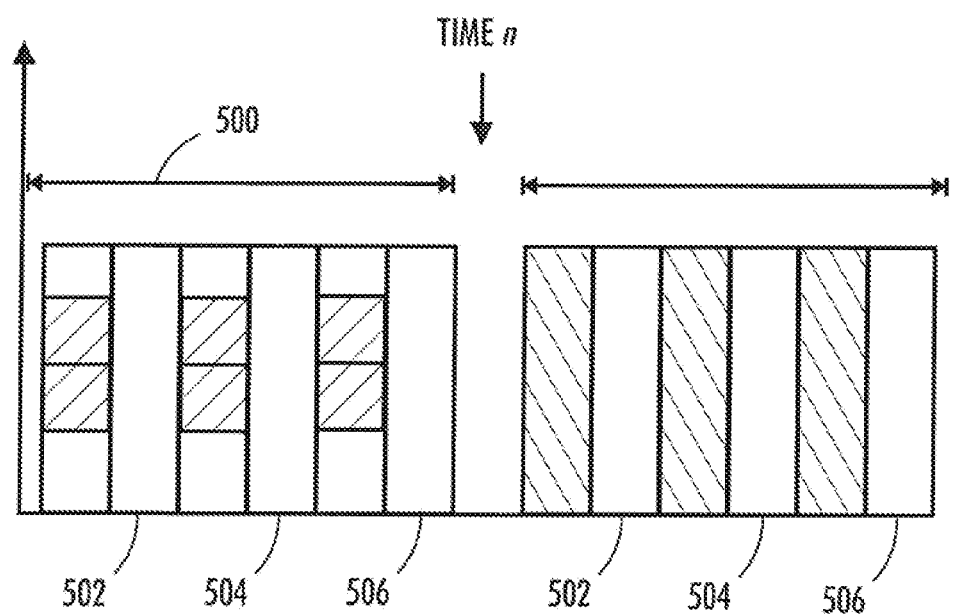
FIG. 5 illustrates an example of a sensing procedure.

Sidelink may be operated in different modes. In mode 1, the network, such as serving nodeB, reserves and allocated resources for sidelink communication of terminal devices. In mode 2, the terminal devices autonomously select resource to be used based on a sensing procedure or a random selection procedure. FIG. 5 illustrates this procedure, where the upper layers of the terminal device request a resource at time n. Prior to the resource selection, the terminal device is configured to perform a sensing procedure in a sensing window 500, in which it is able to find or detect the resources which are currently selected and reserved, as the information of the resource reservation is carried in the Sidelink Control Information, SCI. In the example of FIG. 5, resources 502, 504, 506 are detected to be available for use. At time n, the terminal device may select a resource 504, based on the sensing, from a pool of resources in time and frequency. This resource may be randomly selected from a set of available resources in the resource selection window. The terminal device may perform listen-before-talk, LBT, test before transmitting using the resource, if the sidelink takes place in un-licensed band.

As mentioned above, a power/energy-constraint user, such as Vulnerable Road Users, VRU, usually use portable terminal devices which have a limited battery capability. Table 1 below presents the requirements specified for of VRU users in relation to communication range, service level latency, and service level reliability. The latency requirements are very stringent and the use of DRX makes it difficult to achieve the specified latency requirement. Thus, DRX operation should be enhanced in such way so as on the one hand to reduce the power consumption (especially for the terminal devices with battery limitations) and on the other hand to enable the delivery of the messages with the required latency and/or reliability.

TABLE 1

| Key Performance Indicator | Value |
| --- | --- |
| Range [m] | 80 (min), 150 (urban), 300 (rural) |
| Service Level Latency [ms] | 20 (recommended), 100 |
| Service Level Reliability | 99.9% |

In an embodiment, a transmitting terminal device may be aware of a SL DRX configuration, which is used by its receiving terminal device to receive from the transmitting terminal device, for example configured by the transmitting/receiving device, network configuration, UE pre-configuration, and/or negotiation between the transmitting and receiving terminal devices. In this case, if the data is generated at the transmitting terminal device outside the receiving terminal device's DRX OnDuration used for the considered link between the transmitting terminal device and the receiving terminal device, the transmitting terminal device may have to postpone its data transmission to the next-upcoming receiving terminal device's DRX OnDuration, in order to make sure that the receiving terminal device is active in monitoring the PC5 to receive the SL transmission. This results in a large latency.

However, in some cases, the latency may be reduced, e.g. if the receiving terminal device may be active in monitoring/receiving PC5 with another third terminal device before the next-upcoming receiving terminal device's DRX OnDuration used for receiving from the transmitting terminal device. It may be noted that the communication with the receiving terminal device and the third terminal device may not be known by the transmitting terminal device, since the communication between the receiving terminal device and the third terminal device may use a link identifier(s) different from that used between the receiving terminal device and the transmitting terminal device. Further, the DRX configuration used for the communication between the receiving terminal device and the third terminal device may or may not be the same as the DRX configuration used for the communication between the receiving terminal device and the transmitting terminal device.

Figure 6A:
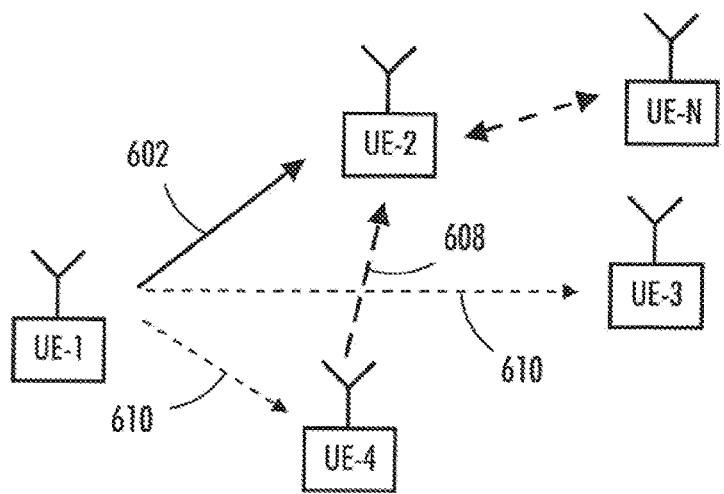
FIGS. 6A and 6B illustrate an example of communication in a group having a common discontinuous transmission configuration.
Figure 6B:
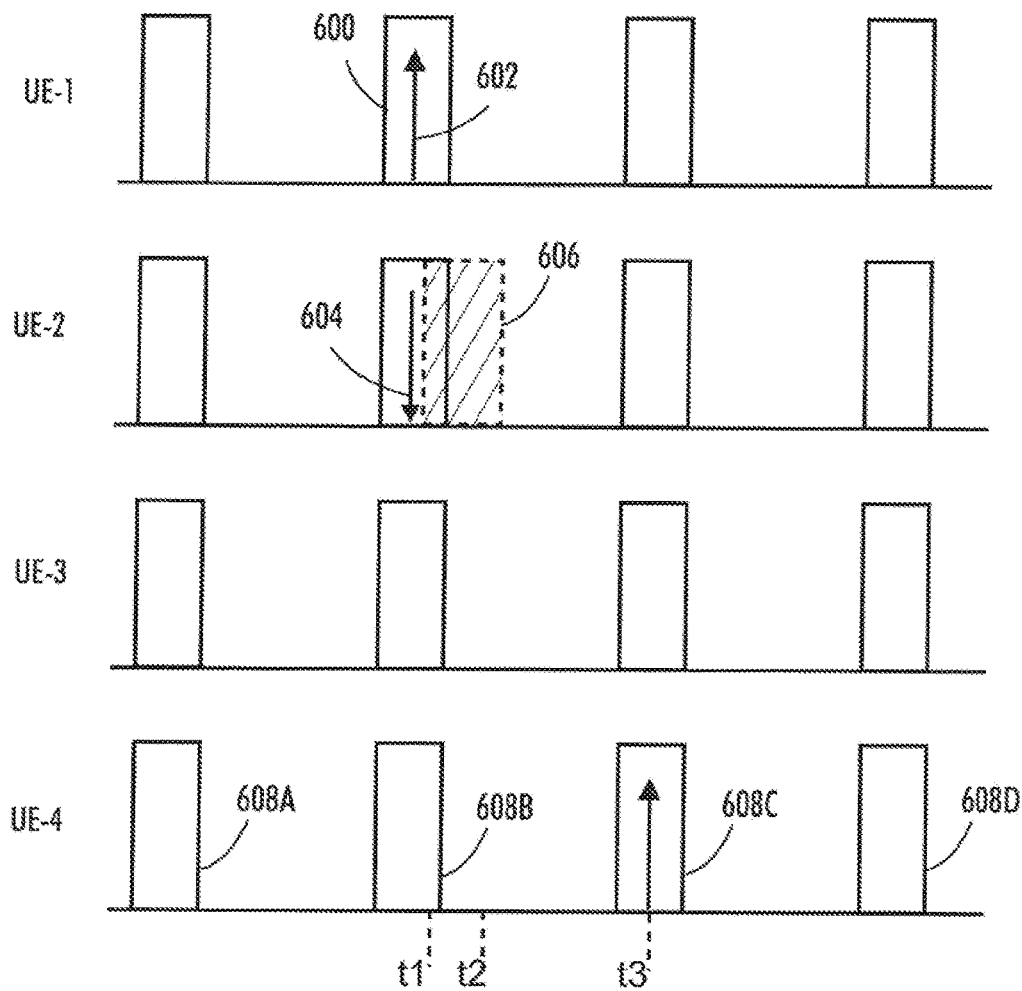

When a terminal device in a group wants to transmit to another terminal device belonging to the same group, it may be configured to follow the procedure for resource sensing and selection as described above in connection with FIG. 5. When DRX is configured, the transmitting terminal device has to further make sure its transmission reaches the receiving terminal device within the DRX OnDuration of the receiving terminal device. Hence, if it does not find free resources within the current DRX OnDuration, the transmitting terminal device has to postpone its transmission to the next-upcoming DRX ON time. This increases latency. FIGS. 6A and 6B illustrate this example.

Terminal device UE-1 has reserved resources 600 for a transmission in the current DRX ON time. The terminal device UE-1 may unicast 602 to terminal device UE-2 as illustrated in FIG. 6B or it may groupcast 602,610 to UE-2, UE-3 and UE-4 in FIG. 6A.

Upon SL reception 604 at terminal device UE-2, the InactivityTimer is (re)started, hence, the DRX OnDuration of UE-2 is extended. The extended DRX OnDuration can be further extended 606 as long as there is new data transmitted towards the UE-2, for example upon UE-2 receiving an SCI addressing to itself.

The terminal device UE-4 has a need (data is generated, for example) to unicast 608 to terminal device UE-2 within the same DRX OnDuration (for example at time instant t1 in FIG. 6B) or sometime before next upcoming DRX OnDuration (for example at time instant t2 in FIG. 6B). For transmission to UE-2, the terminal device UE-4 is only aware that UE2 will be awake in the pre-defined/configured DRX OnDuration used by UE-2 to receive from UE-4. UE-4 has no knowledge that UE-2 is further 606 awake due to its other activities, as with UE-1 in this example.

Therefore, the first transmission from UE-4 to UE-2 is considered by UE-4 only possible in the short known DRX OnDuration 608A, 608B, 608C, 608D used by UE-2 to receive from UE-4. In an example, UE-4 may not find an available resource for transmission in the current DRX OnDuration of UE-2. However, UE-1 may keep transmitting towards UE-2 during the of DRX on-time of UE-2 which results in UE-2's extending 606 its DRX OnDuration. In this case, UE-4 may not know that UE-2 is active to receive SL due to UE-2's communication with UE-1. In another example, UE-4 may detect the need to transmit at some time instant before next upcoming DRX OnDuration (e.g. at time instant t2 in FIG. 6B). In this case, UE-4 may also not know that UE-2 is active to receive SL due to UE-2's communication with UE-1.

The terminal device UE-4 is forced to wait until next DRX OnDuration time to perform its transmission, for example at time t3 in FIG. 6B. In other words, it must delay its transmission to UE-2. This increases latency.

Figure 7:
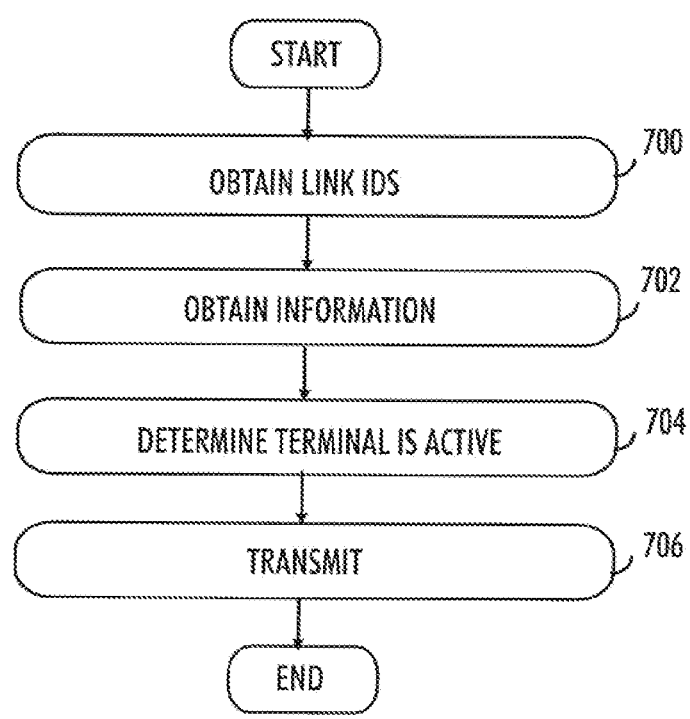
FIG. 7 is a flowchart illustrating an embodiment.

The flowchart of FIG. 7 illustrates an embodiment. The flowchart illustrates an example of the operation of an apparatus. In an embodiment, the apparatus may be a terminal device, user equipment, a part of a terminal device or any other apparatus of a telecommunication system and capable of executing following steps.

In step 700, the apparatus is configured to obtain one or more link identifiers used by a first terminal device. The apparatus may obtain one or more link identifiers of a first terminal device by UE-implementation, e.g. using upper layer context or by receiving at least some of the link identifiers from the first terminal device or exchanging link identifiers with the first terminal device utilising signalling. In an embodiment, the obtained one or more link identifiers are different from the link identifiers used by the apparatus to communicate with the first terminal device. The communication may be transmission from/to another terminal to/from the first terminal device.

In step 702, the apparatus is configured to obtain information on communication of another terminal device with the first terminal device based on the obtained one or more link identifiers.

In order to obtain the information, the apparatus may detect communication of another terminal device with the first terminal device by receiving a transmission and detecting a determined link identifier used by the first terminal device in sidelink control information and/or the data payload of the transmission.

In step 704, the apparatus is configured to determine, based on the obtained information, that the first terminal device is active for communication, such as sidelink reception.

In step 706, the apparatus is configured to transmit to the first terminal device based on the determination.

Figure 8A:
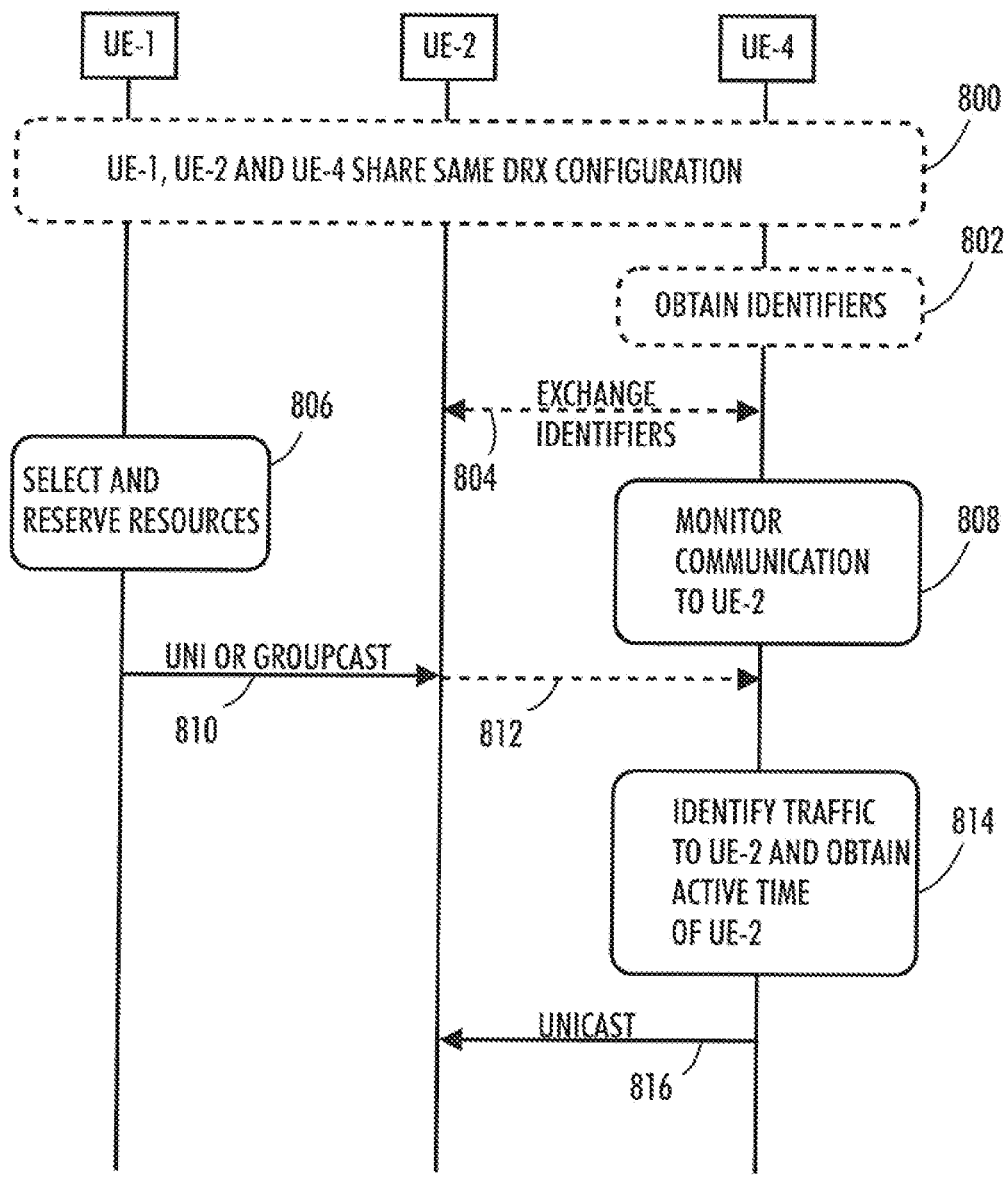
FIG. 8A illustrates a signalling chart.
Figure 8B:
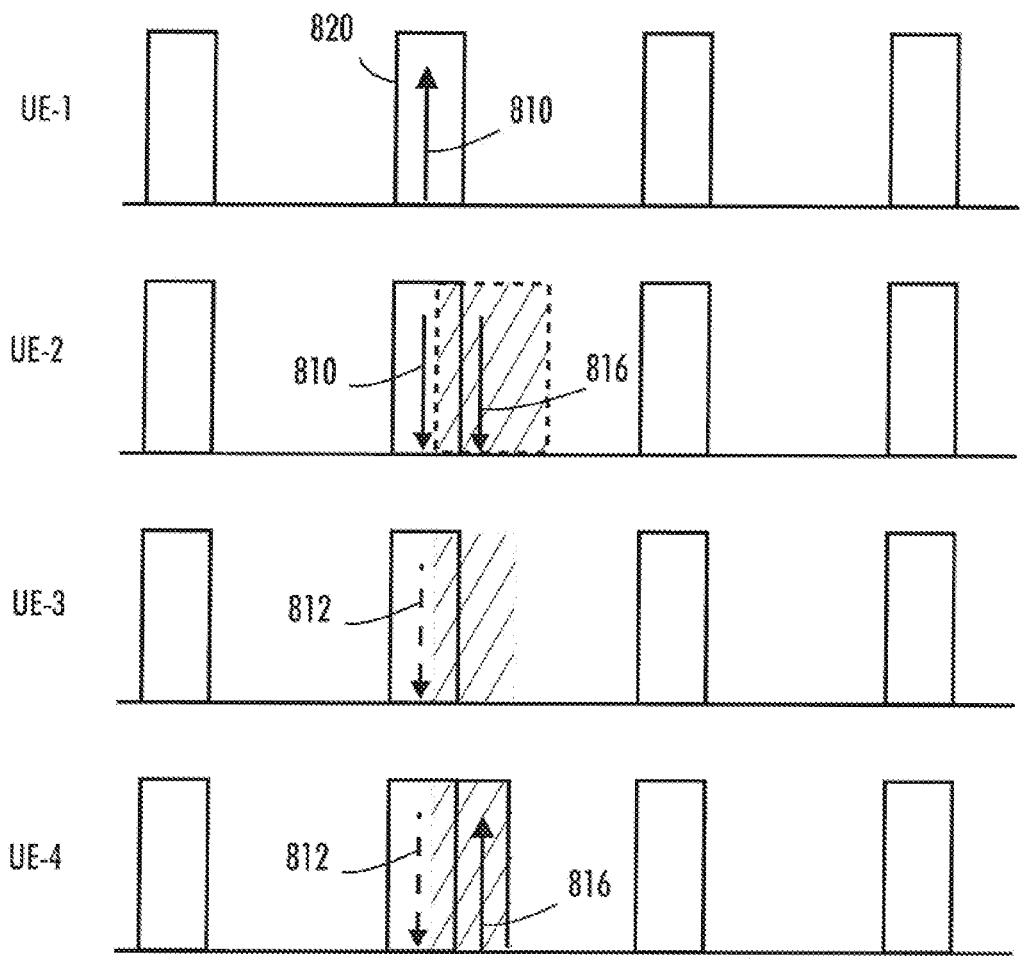
FIG. 8B illustrates an example of resource usage.

FIGS. 8A and 8B illustrate an embodiment. FIG. 8A illustrates a signalling chart and FIG. 8B resource usage. The situation is also illustrated in FIG. 6A A group of sidelink terminal devices UE-1, UE-2, UE-3, UE-4 may share 800 a same DRX configuration (for example for the same groupcast service) based on their group relation and/or supported sidelink services. It may be noted that it is optional for UE1, UE-2, UE-3, UE-4 to share a same DRX configuration for implementing at least some of the embodiments. Any of the group members may have other DRX configuration with other/different terminal devices. In the example situation illustrated in FIG. 6A, UE-1, UE-2, UE-3, and UE-4 are considered to share one DRX configuration and UE-2 may have another additional DRX configurations (with UE-N). In addition, in order to facilitate the unicast transmission from UE-4 to UE-2, UE-2 and UE-4 may be configured with another DRX configuration or they may use an existing DRX configuration at UE-4 and/or UE2 for performing the unicast transmission.

The terminal device UE_4 obtains one or more link identifiers used by UE-2.

The terminal device UE-4 derives 802 some of the link identifiers, L2/L1 IDs, service IDs, and/or application layer IDs, by UE-2 for unicast/groupcast/broadcast transmission/ reception of UE-2. The link identifiers may be the source and/or destination ID used by UE-2. In an embodiment, the link identifiers are used by UE-2 for communicating with UE(s) other than UE-4 and, thus, they are different from the identifiers used by UE-4 to communicate with UE-2. The identifiers may be obtained for example by using upper layer context. In the embodiment of FIG. 8A, we assume UE-4 may derive the L2/L1 ID(s) used by UE-2 to receive a groupcast. For instance, UE-4 and UE-2 may be in a same group, and they are triggered by the group or by the group leader to set up a PC5 connection for facilitating a unicast communication between them. In this case, UE-2 and/or UE-4 may know that they are in the same group. Thus, besides the link identifier(s) used for their unicast communication, UE-2 and UE-4 may know the link identifier(s), e.g. the L1/L2 groupcast destination ID, used for the groupcast transmission to the group, where both UE-2 and UE-4 are the intended receivers. It is noted, the groupcast in the group and the unicast between UE-2 and UE-4 may or may not use the same DRX configuration.

Alternatively, UE-2 and UE-4 may exchange 804 by way of signalling the link identifiers they use for unicast/groupcast/broadcast transmission/reception.

In an embodiment, UE-2 and UE-4 may further exchange other DRX configurations they may have (for other unicast, groupcast and/or broadcast), for example the (minimal) value of DRX InactivityTimer. Alternatively, or additionally, the other DRX configurations may be associated to the IDs exchanged to the peer UE. In an embodiment, for each cast-type, e.g. unicast, groupcast, or broadcast, one UE may send the minimal value of DRX InactivityTimer associated to the different link identifiers to the peer UE, in order to reduce the signalling.

In an embodiment, if the DRX configuration of some services is provided by the network and/or pre-configuration to both UE-2 and UE-4, UE-4 should be aware of at least some of the DRX configuration at UE-2 for the corresponding services, e.g. the value of DRX-InactivityTimer, DRX-onDurationTimer, SlotOffset, without being indicated by UE-2. In an example, since UE-4 may know at least some of the groupcast/broadcast services at UE-2, UE-4 may check the value of DRX-InactivityTimer from the DRX configurations obtained from the network and/or pre-configuration.

A third UE, e.g. UE-1 in FIG. 8A selects and reserves 806 resources 820 for sidelink unicast 810 to UE-2 during the current DRX ON of UE-2. Alternatively, it may reserve resources for groupcast 812 to the group. For sidelink unicast 810 and/or sidelink groupcast 812, the resources may be reserved and selected also even after the default DRX OnDuration, i.e. in the extended DRX On-duration of UE-2 since UE-2's DRX InactivityTimer resets and restarts upon receiving Sidelink Control Information, SCI, addressing to at least UE-2, which enables UE-1 to continue its transmission towards the UE-2. In addition, the sidelink unicast 810 and/or the sidelink groupcast 812 may indicate the future resources reserved for the transmission(s) from UE-1 to UE-2. It is noted that there is no strict sequence for some steps in the figure. In one example, the sidelink unicast 810 and/or the sidelink groupcast 812 may take before 802, as long as UE-4 records the information received from 810 and/or 812, e.g. in its memory.

UE-4 is configured to monitor 814 for messages from other terminal devices (such as UE-1) to UE-2 and/or vice versa, based on the derived/obtained link identifiers. In other words, UE-4 monitors the activities from PC5 associated to the obtained l1/L2-IDs. Transmissions, and/or future transmissions over the future resources if they are reserved in 810 and/or 812, to/from UE-2 may be from/to UE-1 and/or other UEs out of the current DRX OnDuration of UE-2 obtained by UE4. In this evaluation UE-4 may also monitor/check for UE-2's transmission/reception in different time, e.g. whenever UE-4 monitors the PC5.

In an embodiment, UE-4 may be configured to monitor UE-2's communication even if there is no data generated for transmitting to UE-2. This applies for low latency communication. In this case, since UE-4 always monitors, it will know if UE-2 is active immediately once a new data is generated for transmitting to UE-2, and it can send it directly without waiting.

In an embodiment, if power consumption of UE-4 is to be applied, constraints, it may only monitor other communication to UE-2 after it has received data for transmission but has to wait until the next known DRX OnDuration of UE-2.

In an embodiment, as long as UE-4 has other communication activities resulting UE-4 to monitor the PC5 interface, UE-4 may monitor other communication of UE-2.

When UE-1 transmits 810 to UE-2 (and possible other group members in groupcast 812), UE-4 may also be able to receive and identify that the message is towards UE-2, for example from the ID(s) carried in a received SCI. When UE-4 finds a groupcast or unicast message to UE-2, it knows the InactivityTimer is running on UE-2 and thereby obtains information on UE-2's extended DRX-ON time. This extended/determined sidelink DRX ON duration only covers the sidelink resources indicated by the SL resource pool configuration.

In an embodiment, UE-4 is configured to select existing resources in the obtained extended ON time of UE-2 and make at least the first transmission 816 to UE-2 in the same extended DRX-ON time, as it knows UE-2 is awake. The used transmit resource is also over the sidelink resources indicated by the resource pool configuration.

In an embodiment, if the transmission in 810 and/or 812 indicates at least one future reserved resource for transmission from UE-1 to UE-2, UE-4 may select the same time-domain resource as the indicated resource to transmit to UE-2, wherein the selected resource is not colliding/overlapping with the indicated resource in frequency domain.

In an embodiment, UE-4 may select a resource before the indicated future resource of UE-1.

In an embodiment, the first transmission in 816 may also indicate future reserved resources for transmissions from UE-4 to UE-2, wherein the future reserved resource may or may not be within the obtained extended DRX OnDuration of UE-2.

In an embodiment, UE-4 may decide the extended sidelink DRX OnDuration at UE-2 based on monitoring the HARQ feedback from UE-2. For example, upon detecting a unicast/groupcast transmission to UE-2 that requires a feedback from UE-2, e.g. over a dedicate physical sidelink feedback channel (PSFCH), UE-4 may monitor if UE-2 sends a feedback over the dedicated PSFCH resource to ensure that UE-2 receives the SCI, which triggers UE-2 to extend its sidelink DRX OnDuration.

In an embodiment, if UE-4 detects a transmission from UE2 to a third UE based on the derived/obtained link identifier(s), UE-4 may check if the transmission from UE2 indicates a future reserved resource. If yes, UE-4 may also send the transmission 816 to UE-2, e.g. at least before an indicated resource of UE-2 by taking account of the processing time at UE-2 for performing resource pre-emption and/or re-evaluation, since UE-4 may know that UE-2 needs to monitor the PC5 interface for performing sidelink resource pre-emption and/or re-evaluation.

In an embodiment, if the link identifiers exchanged from UE-2 to UE-4 are associated to certain services, UE-4 may determine the corresponding DRX configuration(s) associated to the link identifiers and/or the associated services, e.g. by using the configuration obtained from its pre-configuration and/or network, e.g. from the broadcasted system information block and/or the to dedicate signalling. In this case, UE-4 can obtain the information regarding when UE-2 is in DRX OnDuration to monitor the PC5 interface based on the determined DRX configurations. In this case, some of the steps in FIG. 8A may be optional to facilitate the unicast transmission in step 816, e.g. steps 806, 808, 810, 812.

As UE-4 needs not to delay its transmission to UE-2 until next DRX ON time of UE-2 to perform its transmission, latency is reduced. In addition, due to the reduced latency, more retransmission attempts can be performed by UE-4 before the packet delay budget expires at UE-4. Moreover, since UE-4's transmission towards UE-2 takes place outside the configured DRX OnDuration of UE-2, it reduces congestion level if multiple UEs would transmit towards UE-2 in the same configured DRX OnDuration of UE-2.

DRX may be applied to reduce the power consumption of handheld devices having a limited battery capacity. However, with the disclosed solution latency may be kept minimum regardless of the use of DRX. Delay is reduced in sidelink transmission when DRX is enabled without sacrificing latency. Further, communication reliability is better. Terminal device such as UE-2 does not need to monitor unnecessarily which reduces power consumption. Further, the proposed solution leads to more efficient usage of receiving terminal device's wakeup time when it will receive transmitted data when it is already awake. Any added signalling overhead is not needed.

It may be considered that a medium low DRX cycle of 160 ms is sufficient to override the required latency of 100 ms, if a transmitting VRU terminal device has to wait a single DRX cycle before it can transmit. Hence, with the disclosed solution where a whole DRX cycle wait time can be avoided brings significant improvement.

Figure 9:
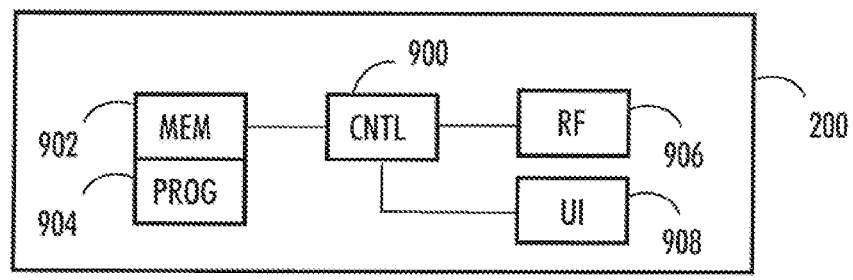
FIG. 9 illustrates an example of an apparatus.

FIG. 9 illustrates an embodiment. The figure illustrates a simplified example of an apparatus applying embodiments of the invention. In some embodiments, the apparatus may be a terminal device 200, or a part of a terminal device of a telecommunication system.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 200 of the example includes a control circuitry 900 configured to control at least part of the operation of the apparatus.

The apparatus may comprise a memory 902 for storing data. Furthermore, the memory may store software 904 executable by the control circuitry 900. The memory may be integrated in the control circuitry.

The apparatus may comprise one or more interface circuitries 906, 908. The interface circuitries are operationally connected to the control circuitry 900. An interface circuitry 906 may be a set of transceivers configured to communicate with a RAN node, such as an (e/g)NodeB of a wireless communication network, or communicate utilising sidelink communication with a terminal device. The interface circuitry may be connected to an antenna arrangement (not shown). The apparatus may also comprise a connection to a transmitter instead of a transceiver. The apparatus may further comprise a user interface 908.

In an embodiment, the software 904 may comprise a computer program comprising program code means adapted to cause the control circuitry 900 of the apparatus to realise, utilising the components of the apparatus, at least some of the embodiments described above.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute at least the following: obtaining one or more link identifiers used by a first terminal device; obtaining information on communication of another terminal device with the first terminal device based on the obtained one or more link identifiers; determining, based on the obtained information, that the first terminal device is active for communication; transmitting to the first terminal device based on the determination.

An embodiment provides a non-transitory computer readable medium comprising program instructions for causing an apparatus to perform at least the following: obtaining one or more link identifiers used by a first terminal device; obtaining information on communication of another terminal device with the first terminal device based on the obtained one or more link identifiers; determining, based on the obtained information, that the first terminal device is active for communication; transmitting to the first terminal device based on the determination.

An embodiment provides a computer readable medium comprising to program instructions for causing an apparatus to perform at least the following: obtaining one or more link identifiers used by a first terminal device; obtaining information on communication of another terminal device with the first terminal device based on the obtained one or more link identifiers; determining, based on the obtained information, that the first terminal device is active for communication; transmitting to the first terminal device based on the determination.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst several computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus in a communication system comprising at least one processor; and at least one memory including computer program code, the at least one memory and computer program code configured to, with the at least one processor, cause the apparatus to:
   obtain one or more link identifiers used by a first terminal device;
   obtain information of communication of another terminal device with the first terminal device based on the obtained one or more link identifiers;
   determine, based on the obtained information, that the first terminal device is active for communication; and
   transmit to the first terminal device based on the determination; and
   determine that the first terminal device is active for sidelink reception based on detecting a communication between another terminal device and the first terminal device by monitoring the communication and detecting a determined link identifier used by the first terminal device in at least one sidelink control information and data payload of the communication;
   wherein the first terminal device and the another terminal device exchange other DRX configurations they have for other cast-types, the cast-types including unicast, groupcast and broadcast,
   wherein at least one of the other DRX configurations is the minimal value of DRX InactivityTimer,
   wherein the other DRX configurations are associated to the identifiers exchanged to a designated peer terminal device,
   wherein for each cast-type one terminal device may send the minimal value of DRX InactivityTimer associated to the different link identifiers to the peer terminal in order to reduce the signalling,
   wherein when the DRX configuration of some services is provided by the network and/or pre-configuration to both the first terminal device and the another terminal device, the another terminal device is aware of at least some of the DRX configurations at the first terminal device for the corresponding services, the at least some of the DRX configurations including a value of DRX-Inactivity Timer, a value of DRX-onDurationTimer, and a SlotOffset, without being indicated by the first terminal device.

2. The apparatus of claim 1, the at least one memory and the computer program code configured to, with the at least one processor, cause the apparatus further to:
   obtain one or more link identifiers used by the first terminal device by receiving at least some of the link identifiers from the first terminal device.

3. The apparatus of claim 1, the at least one memory and the computer program code configured to, with the at least one processor, cause the apparatus further to:
   obtain one or more link identifiers used by the first terminal device based on at least one or more groupcast(s) transmitted to at least both the apparatus and the first terminal device.

4. The apparatus of claim 1, the at least one memory and the computer program code configured to, with the at least one processor, cause the apparatus further to:
   receive from the first terminal device at least some of the discontinuous reception configurations associated to the obtained one or more link identifiers and used by the first terminal device different from the discontinuous reception configuration used for unicast communication between the apparatus and the first terminal device.

5. The apparatus of claim 1, wherein
   the obtained one or more link identifiers used by a first terminal device are different from the link identifiers used for the unicast communication between the first terminal device and the apparatus.

6. The apparatus of claim 1, wherein
   the another terminal device is configured to monitor the first terminal device's communication when no data generated for transmitting to the first terminal device for low latency communication, wherein the another terminal device is aware when the first terminal device is active immediately once a new data is generated for transmitting to the first terminal device and the another terminal device can send the new data directly without waiting.

7. A telecommunication system, comprising one or more apparatuses comprising at least one processor; and at least one memory including computer program code, the at least one memory and computer program code configured to, with the at least one processor, cause the one or more apparatuses to:
   obtain one or more link identifiers used by a first terminal device;
   obtain information of communication of another terminal device with the first terminal device based on the obtained one or more link identifiers;
   determine, based on the obtained information, that the first terminal device is active for communication;
   transmit to the first terminal device based on the determination;

determine that the first terminal device is active for sidelink reception based on detecting a communication between another terminal device and the first terminal device by monitoring the communication and detecting a determined link identifier used by the first terminal device in at least one sidelink control information and data payload of the communication;

wherein the first terminal device and the another terminal device exchange other DRX configurations they have for other cast-types, the cast-types including unicast, groupcast and broadcast, wherein at least one of the other DRX configurations is the minimal value of DRX InactivityTimer, wherein the other DRX configurations are associated to the identifiers exchanged to a designated peer terminal device, wherein for each cast-type one terminal device may send the minimal value of DRX InactivityTimer associated to the different link identifiers to the peer terminal in order to reduce the signalling, wherein when the DRX configuration of some services is provided by the network and/or pre-configuration to both the first terminal device and the another terminal device, the another terminal device is aware of at least some of the DRX configurations at the first terminal device for the corresponding services, the at least some of the DRX configurations including a value of DRX-InactivityTimer, a value of DRX-onDurationTimer, and a SlotOffset, without being indicated by the first terminal device.

8. The system of claim 7, the at least one memory and the computer program code configured to, with the at least one processor, cause the apparatus further to:
obtain one or more link identifiers used by the first terminal device by receiving at least some of the link identifiers from the first terminal device.

9. The system of claim 7, the at least one memory and the computer program code configured to, with the at least one processor, cause the apparatus further to:
obtain one or more link identifiers used by the first terminal device based on at least one or more groupcast(s) transmitted to at least both at least one of the one or more apparatuses and the first terminal device.

10. The system of claim 7, the at least one memory and the computer program code configured to, with the at least one processor, cause the apparatus further to:
receive from the first terminal device at least some of the discontinuous reception configurations associated to the obtained one or more link identifiers and used by the first terminal device different from the discontinuous reception configuration used for unicast communication between at least one of the one or more apparatuses and the first terminal device.

11. The system of claim 7, wherein
the obtained one or more link identifiers used by a first terminal device are different from the link identifiers used for the unicast communication between the first terminal device and at least one of the one or more apparatuses.

12. The system of claim 7, wherein
the another terminal device is configured to monitor the first terminal device's communication when no data generated for transmitting to the first terminal device for low latency communication, wherein the another terminal device is aware when the first terminal device is active immediately once a new data is generated for transmitting to the first terminal device and the another terminal device can send the new data directly without waiting.

13. A method in an apparatus of a communication system, comprising:
obtaining one or more link identifiers used by a first terminal device;
obtaining information on communication of another terminal device with the first terminal device based on the obtained one or more link identifiers;
determining, based on the obtained information, that the first terminal device is active for communication;
transmitting to the first terminal device based on the determination;
determining that the first terminal device is active for sidelink reception based on detecting a communication between another terminal device and the first terminal device by monitoring the communication and detecting a determined link identifier used by the first terminal device in at least one sidelink control information and data payload of the communication;
wherein the first terminal device and the another terminal device exchange other DRX configurations they have for other cast-types, the cast-types including unicast groupcast and broadcast,
wherein at least one of the other DRX configurations is the minimal value of DRX InactivityTimer,
wherein the other DRX configurations are associated to the identifiers exchanged to a designated peer terminal device,
wherein for each cast-type one terminal device may send the minimal value of DRX Inactivity Timer associated to the different link identifiers to the peer terminal in order to reduce the signalling,
wherein when the DRX configuration of some services is provided by the network and/or pre-configuration to both the first terminal device and the another terminal device, the another terminal device is aware of at least some of the DRX configurations at the first terminal device for the corresponding services, the at least some of the DRX configurations including a value of DRX-InactivityTimer, a value of DRX-onDurationTimer, and a SlotOffset, without being indicated by the first terminal device.

14. The method of claim 13, further comprising:
obtaining one or more link identifiers used by the first terminal device by receiving at least some of the link identifiers from the first terminal device.

15. The method of claim 13, further comprising:
obtaining one or more link identifiers used by the first terminal device based on at least one or more groupcast (s) transmitted to at least both the apparatus and the first terminal device.

16. The method of claim 13, further comprising:
receiving from the first terminal device at least some of the discontinuous reception configurations associated to the obtained one or more link identifiers and used by the first terminal device other than the discontinuous reception configuration used for unicast communication between the apparatus and the first terminal device.

17. The method of claim 13, wherein:
the obtained one or more link identifiers used by a first terminal device are different from the link identifiers used for the unicast communication between the first terminal device and the apparatus.

18. The method of claim 13, wherein
the another terminal device is configured to monitor the first terminal device's communication when no data generated for transmitting to the first terminal device for low latency communication, wherein the another terminal device is aware when the first terminal device is active immediately once a new data is generated for transmitting to the first terminal device and the another terminal device can send the new data directly without waiting.

19. A non-transitory computer readable medium comprising program instructions for causing an apparatus to perform at least the following:
obtaining one or more link identifiers used by a first terminal device;
obtaining information on communication of another terminal device with the first terminal device based on the obtained one or more link identifiers;
determining, based on the obtained information, that the first terminal device is active for communication;
transmitting to the first terminal device based on the determination;
determining that the first terminal device is active for sidelink reception based on detecting a communication between another terminal device and the first terminal device by monitoring the communication and detecting a determined link identifier used by the first terminal device in at least one sidelink control information and data payload of the communication;
wherein the first terminal device and the another terminal device exchange other DRX configurations they have for other cast-types, the cast-types including unicast, groupcast and broadcast,
wherein at least one of the other DRX configurations is the minimal value of DRX InactivityTimer,
wherein the other DRX configurations are associated to the identifiers exchanged to a designated peer terminal device,
wherein for each cast-type one terminal device may send the minimal value of DRX InactivityTimer associated to the different link identifiers to the peer terminal in order to reduce the signalling,
wherein when the DRX configuration of some services is provided by the network and/or pre-configuration to both the first terminal device and the another terminal device, the another terminal device is aware of at least some of the DRX configurations at the first terminal device for the corresponding services, the at least some of the DRX configurations including a value of DRX-InactivityTimer, a value of DRX-onDuration Timer and a SlotOffset, without being indicated by the first terminal device.

20. The non-transitory computer readable medium of claim 19, wherein the program instructions further cause the apparatus to:
receive from the first terminal device at least some of the discontinuous reception configurations associated to the obtained one or more link identifiers and used by the first terminal device other than the discontinuous reception configuration used for unicast communication between the apparatus and the first terminal device; and
wherein the another terminal device is configured to monitor the first terminal device's communication when no data generated for transmitting to the first terminal device for low latency communication, wherein the another terminal device is aware when the first terminal device is active immediately once a new data is generated for transmitting to the first terminal device and the another terminal device can send the new data directly without waiting.

\* \* \* \* \*